United States Patent
Hardebeck et al.

(10) Patent No.: US 9,917,880 B2
(45) Date of Patent: Mar. 13, 2018

(54) METHOD AND APPARATUS FOR ENABLING PARTICIPANTS TO ASSUME CONTROL OVER A PRESENTATION IN A REMOTE VIEWING SESSION

(71) Applicant: Glance Networks, Inc., Arlington, MA (US)

(72) Inventors: Edward F. Hardebeck, Brookline, MA (US); Richard L. Baker, Belmont, MA (US); Deborah Mendez, Arlington, MA (US)

(73) Assignee: Glance Networks, Inc., Arlington, MA (US)

( * ) Notice: Subject to any disclaimer, the term of this patent is extended or adjusted under 35 U.S.C. 154(b) by 452 days.

(21) Appl. No.: 14/620,943

(22) Filed: Feb. 12, 2015

(65) Prior Publication Data

US 2015/0172362 A1    Jun. 18, 2015

Related U.S. Application Data

(62) Division of application No. 12/414,646, filed on Mar. 30, 2009, now Pat. No. 8,966,374.

(51) Int. Cl.
| | | |
|---|---|---|
| *G06F 3/0481* | (2013.01) | |
| *H04L 29/08* | (2006.01) | |
| *G06Q 10/10* | (2012.01) | |
| *H04N 7/15* | (2006.01) | |
| *H04L 29/06* | (2006.01) | |
| *G06F 3/0484* | (2013.01) | |

(52) U.S. Cl.
CPC ........ *H04L 67/025* (2013.01); *G06F 3/04812* (2013.01); *G06F 3/04842* (2013.01); *G06Q 10/10* (2013.01); *H04L 67/36* (2013.01); *H04L 67/38* (2013.01); *H04N 7/15* (2013.01)

(58) Field of Classification Search
CPC . H04L 67/025; G06F 3/04842; G06F 3/04812
See application file for complete search history.

(56) References Cited

U.S. PATENT DOCUMENTS

| | | | |
|---|---|---|---|
| 5,107,443 A | 4/1992 | Smith et al. | |
| 5,796,396 A | 8/1998 | Rich | |
| 5,838,300 A | 11/1998 | Takagi et al. | |
| 5,905,868 A * | 5/1999 | Baghai | G06F 11/3495 709/201 |
| 5,991,856 A * | 11/1999 | Spilo | G06F 11/0706 711/147 |
| 6,329,984 B1 | 12/2001 | Boss et al. | |
| 8,762,862 B2 * | 6/2014 | Singh | G06Q 10/10 709/204 |
| 9,176,934 B2 * | 11/2015 | Baschy | G06F 17/211 |

(Continued)

*Primary Examiner* — Anil Bhargava
(74) *Attorney, Agent, or Firm* — Anderson Gorecki LLP (57) ABSTRACT

A display computer running remote viewing software may detect when a UAC dialog is shown and send a generic representation of the UAC to viewer participants. Although the software cannot capture the UAC dialog itself, it can detect when a UAC dialog occurs and generate its own generic representation of the UAC dialog to be presented to the viewer participants. The generic representation may include an instruction for the viewer participant to instruct the display participant to respond to the UAC dialog and a generic image of an example UAC dialog.

8 Claims, 6 Drawing Sheets

(56) References Cited

U.S. PATENT DOCUMENTS

| | | |
|---|---|---|
| 2006/0164982 A1 | 7/2006 | Arora et al. |
| 2007/0016773 A1* | 1/2007 | Perlman .............. G06F 21/6218 713/166 |
| 2007/0074128 A1* | 3/2007 | Lim ...................... G06F 3/0481 715/764 |
| 2007/0294626 A1 | 12/2007 | Fletcher et al. |
| 2007/0294627 A1* | 12/2007 | Sauve .................... G06F 9/4443 715/760 |
| 2008/0016155 A1 | 1/2008 | Khalatian |
| 2008/0065996 A1 | 3/2008 | Noel et al. |
| 2008/0147877 A1 | 6/2008 | Brown et al. |
| 2008/0177862 A1 | 7/2008 | Arora et al. |
| 2008/0183817 A1 | 7/2008 | Baek et al. |
| 2008/0189718 A1* | 8/2008 | Gulley .................. G06F 9/5066 718/107 |
| 2008/0256458 A1* | 10/2008 | Aldred ................ G06F 21/6218 715/741 |
| 2009/0043907 A1* | 2/2009 | Peterson .............. G06F 3/0236 709/231 |
| 2009/0222925 A1* | 9/2009 | Hilaiel .................... G06F 21/53 726/25 |
| 2009/0228801 A1 | 9/2009 | Lee et al. |
| 2009/0292999 A1 | 11/2009 | Labine et al. |
| 2009/0293067 A1* | 11/2009 | Singh .................... G06Q 30/02 719/318 |
| 2009/0307612 A1* | 12/2009 | Singh .................... G06Q 10/10 715/758 |
| 2010/0121959 A1* | 5/2010 | Lin ...................... H04L 67/025 709/228 |

\* cited by examiner

METHOD AND APPARATUS FOR ENABLING PARTICIPANTS TO ASSUME CONTROL OVER A PRESENTATION IN A REMOTE VIEWING SESSION

CROSS-REFERENCE TO RELATED APPLICATIONS

This application is a divisional of U.S. patent application Ser. No. 12/414,646, filed Mar. 30, 2009, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

Field

The field relates to visual information systems and, more particularly, to a method and apparatus for enabling participants to assume control over a presentation in a remote viewing session.

Description of the Related Art

Telephones enable people to communicate verbally, but do not enable participants to a telephone call to exchange visual information with each other. Conventionally, when visual information such as a PowerPoint (™ Microsoft Corporation) presentation or a document was to be referenced during a telephone conversation, the visual information would be faxed, e-mailed, or otherwise physically sent to the participants so that the participants could have the reference materials available during the telephone call.

As technology evolved, software was developed to allow information being shown on one computer monitor (display information), to be made visible on another computer monitor associated with another computer at a different location (viewer information). Software of this nature will be referred to herein as "Remote Viewing Software" (RVS). The computer that is showing the information will be referred to herein as the "display" and the computer that is being used to look at the information remotely will be referred to herein as the "viewer".

Figure 1:
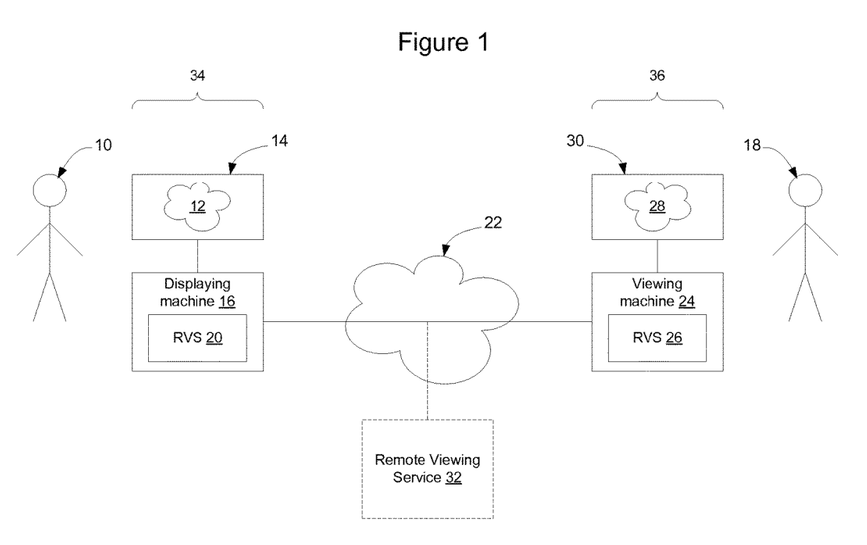
FIG. 1 is a functional block diagram illustrating the participants to a remote viewing session.

FIG. 1 illustrates an example of a typical way in which remote viewing of display information may take place. As shown in FIG. 1, a display participant 10 may desire to allow display information 12 appearing on the display monitor 14 associated with a display computer 16, to be made available to a viewer participant 18. To do so, RVS software 20 on the display computer 16 will capture the display information 12 and pass it over a network 22 to a viewer machine 24. An instantiation of the RVS software 26 (which may be the same as RVS software 20 or a limited version of RVS software 20) will decode the display information received over the remote viewing session to generate viewer information 28 that will be caused to appear on the viewer monitor 30. A remote viewing service 32 may be provided to support viewing sessions on the network.

A combination of the display computer and display monitor will collectively be referred to herein as a "display" 34. The display computer and display monitor may be separate devices or integrally formed. Although the term "monitor" typically refers to a computer monitor, the display 34 may have any type of component that enables the display information 12 to be shown to the participant 10. Similarly, a combination of a viewer machine and viewer monitor will collectively be referred to herein as a "viewer" 36. Like the display, the viewer machine and viewer monitor may be separate devices or integrally formed.

By looking at the viewer information 28 on the viewer monitor 30, the viewer participant 18 may thus see a reproduction of what the display participant is being shown on the display monitor 14. A remote viewing session over which the display information is transmitted may be implemented directly by the display machine 16 or, optionally, the remote viewing service 32 may assume a portion of the tasks required to implement the session.

When the system of FIG. 1 is in use, the display participant may cause a desired visual presentation to appear as viewer information on the viewer monitor 30 simply by causing the desired visual presentation to appear on his local display monitor. Since the display participant 10 is able to control the display computer, and hence the content that is used to form the display information being shown on the display monitor, the display participant may control the content that is made to appear on the viewer monitor. Reference may then be made to the shared information to enable more effective communication to take place between the display participant and viewer participants.

Remote Viewing Software (RVS) tools vary significantly in their complexity. For example, some RVS tools require all participants to have special purpose RVS software installed on their machines, firewalls custom configured to enable traffic to pass over the networks, and require extensive training Other RVS tools are much simpler to use, such as the RVS tool developed by Glance Networks™.

Depending on the circumstances, it may be desirable for the display participant to allow another participant to control the presentation that is being shown by the display computer. For example, two people may be making a joint presentation to a group and may wish to present different portions of a unified presentation. If one of the two presenters initiates a session, it may be desirable for the presenter to cede control of his machine to the other presenter for the other portion of the presentation. As another example, a person giving a software demonstration or performing software training may wish to allow one of the viewers to interact with the software, e.g. to interact with the user interface of the software that is being demonstrated. In these and other situations, it may be desirable for the display participant to allow one or more of the viewer participants to assume control over the display computer during a remote viewing session.

SUMMARY

Control of the display computer may be ceded to a viewer participant so that the viewer participant may control the software running on the display computer and, hence, so that the viewer participant may control the display information being shown during the remote viewing session. Simplified controls are used to enable control to be granted by the display participant and to enable the display participant to regain control over the session. Likewise, simplified controls are provided to the viewer participant to enable the viewer participant to assume control over the display during the remote viewing session. Rather than implementing a menu-driven system, the controls are implemented to be natural such that control may easily and quickly flow between the participants to the remote viewing session. In one embodiment, the display participant may elect to provide control to a particular viewer participant or to any viewer participant on the session. Any viewer participant that has the ability to assume control will be provided with an altered pointer and optionally a tooltip prompt instructing the viewer participant to "click to control" the display computer. When the viewer participant clicks within the window associated with the remote viewing session, the viewer participant will obtain control over the display computer to assume control over the session.

The display participant may resume control simply by moving his mouse, typing on the keyboard, or otherwise using one or more local inputs at the display computer. If the display participant resumes control over the display computer, or the viewer participant otherwise loses control, the viewer pointer will once again change color and/or shape, and optionally a tooltip may be displayed to the viewer participant, instructing the viewer participant of the loss of control.

The session may be initiated by the display participant associated with the display computer that will generate the display information during the remote viewing session. Alternatively, one of the viewer participants may initiate the session. In this alternative embodiment, when the display joins the session, the display participant may provide control over the display computer to the viewer participant by default, to enable the viewer participant to have control over the display computer.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures.

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, control of the display computer may be ceded by a display participant to a viewer participant, so that the viewer participant may control the software running on the display computer and, hence, so that the viewer participant may control the display information being shown on the remote viewing session. Simplified controls are used to enable control to be granted by the display participant and to enable the display participant to regain control over the session. Likewise, simplified controls are provided to the viewer participant to enable the viewer participant to assume control over the display during the remote viewing session.

In one embodiment, rather than using a complicated menu-driven system to grant and assume control over the remote viewing session, the controls are implemented to be natural such that control may quickly and naturally flow between the participants to the remote viewing session. Initially, if the display participant has control, the display participant may opt, via a button or simplified menu accessible via a dialog, to allow one or more of the viewer participants on the session to assume control over the session. Any viewer participant that has the ability to assume control of the session will be provided with an altered pointer which notifies the viewer participant that they may control the session if desired. Optionally, the viewer participant may also be provided with a tooltip or toast (small informational window) instructing the viewer participant how to obtain control of the session. For example, a tooltip may be temporarily displayed which instructs the viewer participant to "click to control" the session. When the viewer participant interacts with the content of the session, the viewer participant will automatically assume control over the session. The display participant may likewise resume control permanently or temporarily simply by moving his mouse, typing on the keyboard, or otherwise using one or more inputs to the display computer.

One example of a remote viewing system will be described initially to explain in greater detail an environment in which the invention may be implemented. The invention is not limited to implementation in this particular described remote viewing system, however, as aspects of the invention may be used in many different systems and in other types of software unrelated to remote viewing. Additionally, although the invention will be described as being implemented in software, hardware components may be used to implement embodiments of the invention as well, or particular portions of the disclosed invention, and the invention is thus not limited to a software implementation.

Figure 2:
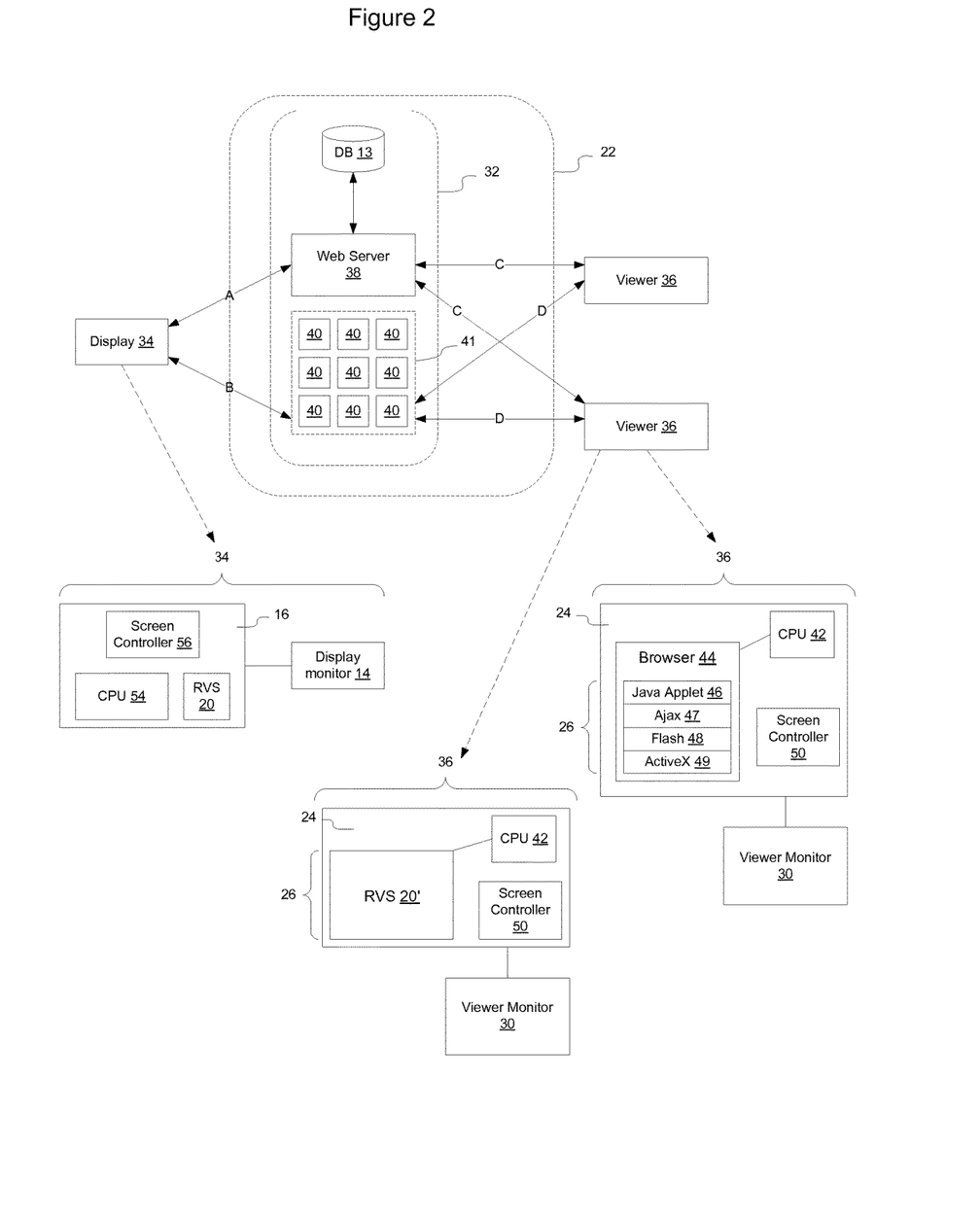
FIG. 2 is a functional block diagram illustrating a network environment that may be used to exchange display information.

FIG. 1, described briefly above, illustrates the basic interconnection of the display 34 and viewer 36 to enable remote viewing of the display information 12 on the viewer monitor 30. FIG. 2 illustrates an example of an implementation in which a remote viewing service 32 is used to perform several of the functions to facilitate the creation of, and use of, remote viewing sessions over a communication network. As shown in FIG. 2, the display 34 and viewers 36 may be connected over the Internet or other network infrastructure 22 to enable sessions to be established, so that viewers 36 may be provided with a representation of the display information 12 shown on display 34. FIG. 2 will be used to describe aspects of operation of the remote viewing service, however the invention is not limited to use in connection with a system such as that shown in FIG. 2, as that system is shown as only one example of a possible system that may be utilized in connection with an embodiment of the invention.

The remote viewing service 32, in the example shown in FIG. 2, includes one or more servers 38, 40 configured to provide an environment over which remote viewing sessions may occur. For example, in the illustrated embodiment, the remote viewing service 32 has a web server 38 configured to provide an environment in which web pages may be created through which participants can connect to RVS sessions. Once the RVS session has been established, data transfer between the displays 34 and the viewers 36 may be supported by the web server 38, by another server 40 associated with the remote viewing service 32, or by a mesh 41 of servers 40. Using a mesh of servers may help to minimize path latency between the displays and the viewers to increase performance of the remote viewing sessions hosted by the remote viewing service 32. The remote viewing service 32 may be architected in many different ways depending on the expected number of sessions, the expected location of participants, the level of involvement of the service, and whether the remote viewing service is to be deployed on a public network such as the Internet or is to be deployed in a more controlled environment such as a private network.

A viewer 36 may access a session using a viewer machine 24 such as a computer or another access device having a CPU 42 configured to provide an environment to support execution of a browser such as an Internet browser 44. To enable session information to be decoded and reassembled by the viewer machine 24, RVS code 26, optionally implemented as a plug-in such as a Java Applet 46, AJAX module 47, Flash (™ Macromedia Corporation) module 48, ActiveX control 49 or other small piece of code may be instantiated in the viewer machine 24 to be executed in connection with in the viewer's browser 44.

Optionally, the RVS code 26, may be downloaded and installed to the viewer machine automatically when the viewer 36 connects to a session, so that the viewer participant 18 need not manually install software to obtain access to the session. Alternatively, a version of RVS software 20' may be implemented as the RVS code 26 on the viewer machine 24. In this embodiment, the viewer 36 may access the content associated with a session directly using a decoder built into the RVS software 20' or the browser might message the installed software to join the session using session ID information entered via the browser. Regardless of the implementation, information received over a session will be decoded by the RVS code 26 and used in connection with a screen controller 50 to cause a representation of the display information 12 to appear on the viewer monitor 30.

Optionally, where the viewer machine 36 is provided with more than one codec, for example where the viewer machine 36 has both a Java applet and a Flash module decoder, the format of the information transferred over the session may change as network conditions change. For example, the system may initially attempt to connect viewers to the session using Flash, then using the Java applet, and then using custom RVS software. To support a session, a download of the Java applet or other code may be required of the viewer. From a network standpoint, the session may be established over a TCP socket, a HTTP tunnel, or via another connection method.

On the display side, a display 34 generally includes a display monitor 14 that is electronically controlled via a display machine 16, which may be a computer or other electronic device. The display machine 16 generally includes a CPU 54 configured to control a screen controller 56 to allow selected information that is generated by the CPU to be shown on the display monitor 14. An instance of RVS software 20 is also instantiated on the display machine 16 to allow information displayed on the display monitor 14 to be identified and selectively encoded for transmission over a session being supported by the remote viewing service 32.

The term "display" is used herein to refer to the device that is running software that generates information to be shared on the remote viewing session. The display may initiate a remote viewing session or, alternatively, one of the viewers may initiate the remote viewing session to cause the display information to be viewable over the network. The term "display" does not, therefore, refer to the initiator of the session but rather refers to the device that is generating the information that will be shown on the remote viewing session.

Figure 3A:
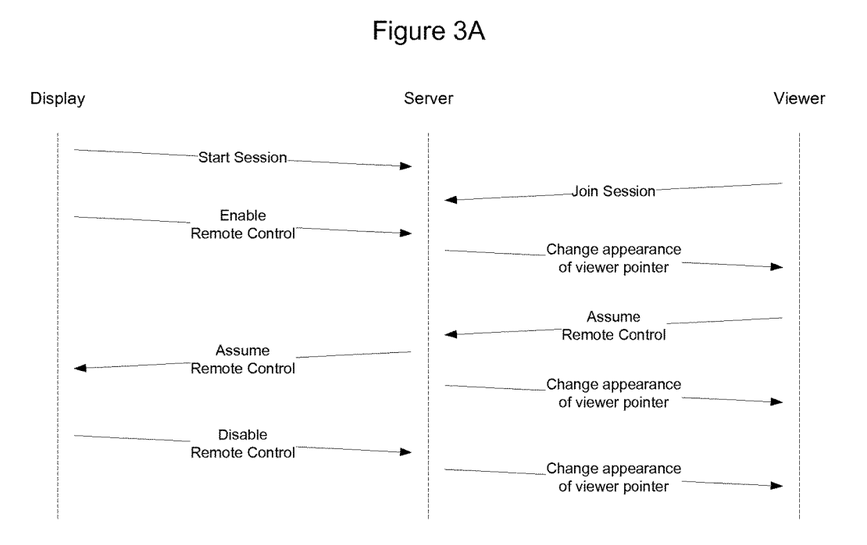
FIG. 3A shows a way for a display participant to initiate a remote viewing session which may be joined by one or more viewer participants, and in which the display participant may allow remote control over the display computer by one or more of the viewer participants on the remote viewing session according to an embodiment of the invention.
Figure 3B:
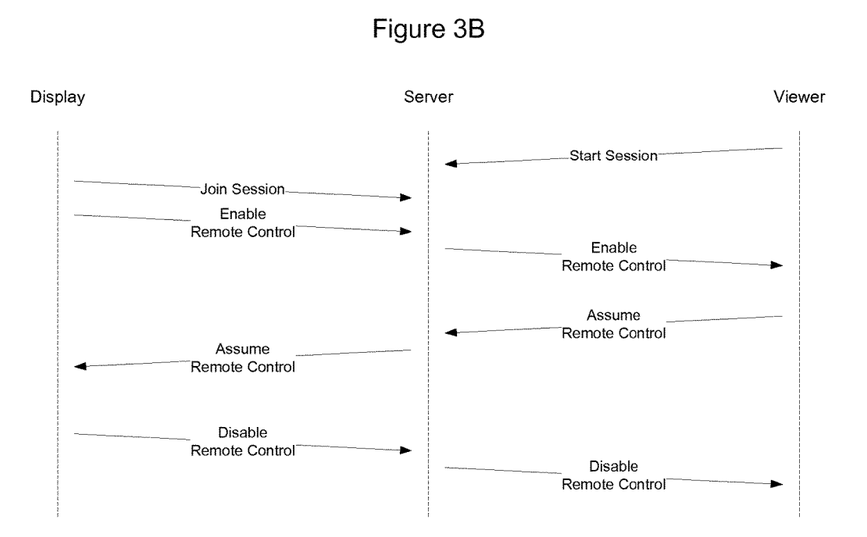
FIG. 3B shows a way for a viewer participant to initiate a remote viewing session that may then be joined by a display participant, and in which the display participant may allow remote control over the display computer by one or more of the viewer participants on the remote viewing session according to an embodiment of the invention.

A session may be initiated by a display (as shown in FIG. 3A) or, alternatively, may be initiated by a viewer (as shown in FIG. 3B). Where the session is to be initiated by the display, the RVS software 20 in the display computer will contact the remote viewing service 32 to establish the session. For example, the RVS software 20 will communicate with one of the web servers 38 associated with the remote viewing service 32 to initiate a session (Arrow A). Session initiation may include authentication, establishing authorization with the server, and setting up accounting entries for the session. Encryption parameters may also be negotiated at this stage. For example, SSL may be used to encrypt the session traffic. Although an embodiment shown in FIG. 3B includes the use of a remote viewing service 32, the invention is not limited in this manner as, in another embodiment, the display computer may contact the viewer directly to establish a remote viewing session.

Once the display 34 has completed the session initiation process with the server 38, a passcode for the session will be generated (either automatically by the server or in connection with display participant input). The passcode will be used to allow viewers 36 to join the session to prevent unauthorized viewers from accessing the session. Multiple forms of session access control may be used and the invention is not limited to the use of any particular form of session access control.

To join a session, a viewer participant communicates with the display participant e.g. via telephone, e-mail, or instant messaging, and obtains the access information associated with the session. The access information may be, for example, a Uniform Resource Locator (URL) associated with the web site that will be used to support the session and which may be used by the viewer's browser 44 to locate the session on the network 22, and a passcode that was generated during the initiation process discussed above. The viewer participant then can use browser 44 to locate the URL on the network, enter the passcode to authenticate with the remote viewing service 32, and connect to the session (Arrow C). If necessary, the RVS code 26 may be downloaded as part of the process of joining the session, or when the browser 44 accesses the website associated with the URL.

As shown in FIG. 3A, once both the display and the viewer join the session, the display participant may enable remote control over the display computer. Alternatively, the remote control may be enabled even before the viewer joins. When remote control is enabled, a border around the window containing the remote viewing session will change color. Additionally, when the window is active and the viewer's cursor is over the window, the viewer's pointer will change color and pop up a tooltip including a phrase such as "click to control" so that the viewer participant knows that he can assume control over the remote viewing session and how to do so. If the viewer participant elects to assume control, inputs from the viewer participant will be conveyed to the display computer to enable the viewer participant to control the display computer. The viewer pointer may be modified while the viewer participant has control to reflect the state of the viewer participant, and to enable the viewer participant to know that he is in control of the display computer. If the display participant elects to disable remote control, the server will be notified and the appearance of the viewer participant's pointer will once again change to notify the viewer participant that control over the display computer has been suspended.

In FIG. 3A, events that may occur during a session are shown by arrows, which may be implemented by messaging between the participants or may be implemented locally at one of the participants as a state change. For example, when a viewer assumes control over the remote viewing session, an explicit "accept remote control" message is not required for the viewer to assume control over the display computer. Rather, the viewer may simply send a mouse or keyboard event message tagged with the ID of the guest. Similarly, the arrow labeled "change appearance of viewer pointer" may be implemented locally by the viewer in response to an enable, disable, suspend, guest suspend, message from the server. Thus, FIG. 3A graphically shows particular events rather than the particular messages that may be used to cause these events to occur. FIG. 3B, discussed below, uses this same convention.

There are times where it may be advantageous to enable a viewer participant to start a session, which then may be joined by the display participant, so that the display information from the display computer may be shown to the session participants. Thus, rather than have the display participant start the remote viewing session, one of the viewers may instead start a remote viewing session which may then be joined by the display participant. For example, a viewer participant may wish to use a remote viewing session in connection with performing computer support to enable the viewer to have access to a person's computer so that the viewer may diagnose and fix the person's computer. By allowing the display participants to connect to sessions established by the viewer participant, the display participants may obtain technical support from the viewer participant. Since the person needing technical support is joining the session as the display, the viewer (who is providing technical support) may assume control over the display computer during the session to enable the viewer to diagnose and fix problems on the display computer. Although this is a potential reason for a viewer to establish a session that may be joined by the display, the invention is not limited to this particular use An example of a process that may be used to enable a session to be started in this manner is shown in FIG. 3B. In this embodiment, initially one of the viewer participants will send a message to the server 32 to start a session. There are many ways for the viewer participant to start a session. For example, the viewer participant may launch Remote Viewing Software (RVS) client on the viewer machine. Alternatively, the viewer's browser might message the installed RVS client to start the session using session information entered into the browser. Likewise, another program on the viewer machine may contact the server to cause the server to set up the session. The session may be established through the web server 38 or through another server 40 or mesh of servers 41 on the network in the same manner as if the display participant had initiated the session.

When the viewer participant receives the response from the server indicating that the session has been established, the viewer participant may contact the display participant to notify the display participant of the web site that will be used for the session and the passcode that may be used to access the session.

If the viewer participant is allowed to initiate a session, it may be that the intended display computer does not have RVS software 20 installed thereon. Accordingly, as part of joining a session, the RVS software may be downloaded to the display computer to enable the display computer to transmit data on the remote viewing session. The RVS software downloaded to the display computer may be a full version of the RVS software or may be a limited version. When the display computer logs off the remote viewing session the RVS software may be removed from the display computer or, alternatively, may remain on the display computer.

When a viewer establishes a session, the viewer participant may identify someone that the viewer participant would like to join as the display. This may be done in several ways. For example, the participant on the session that will be the "display" may be determined chronologically, such that the first entity to join the session after the viewer has joined the session will be deemed to be the "display". Alternatively, the intended display may be provided with a different passcode so that the server can distinguish between participants as they join the session and cause the correct participant to be joined to the session as the "display".

As shown in FIG. 3B, when the viewer participant starts the session and the display participant joins the session, the display participant will enable remote control over the display computer which may then be assumed by the viewer participant. Remote control may be enabled by default, optionally, to accelerate assumption of control by the viewer participant. During the remote viewing session the display participant may disable remote control to regain control of the display computer if desired.

Regardless of how the session is initiated, during the session, the display 34 will transmit updates of the display information to the server(s) (Arrow B) which will then be made available to the viewers 36 over the session (arrow D).

Other network topographies may be utilized as well and the invention is not limited to use in connection with the simplified network view illustrated in FIGS. 1 and 2. Additional details about operation of one example remote viewing software are provided in U.S. patent application Ser. Nos. 11/355,740, 11/355,741, and 11/355,852, all of which were filed on Feb. 16, 2006. The content of each of these applications is hereby incorporated herein by reference.

As noted above, there are times where it may be advantageous to enable a viewer to assume control over what is being shown on the session. For example, where the session is established by a viewer participant rather than the display participant, it may be desirable for the viewer participant to have control over the display computer during the session. This may be useful, for example, in a computer/technical support situation.

Likewise, where the session is established by the display participant, the display participant may want to cede control over the display computer during the session to enable someone else to control what is being shown by the display computer during the remote viewing session. An example of where this may be desirable may be in connection with a joint presentation being provided by two people sitting at different geographic locations. One person may be located at the display computer and another person may be seated at a different location. During the presentation, the two people may want to alternate control over the display computer so that they can control the speed and tempo of the presentation, and so that they may highlight particular aspects of the presentation, for example by drawing on the presentation, etc. As another example, the person making a presentation may wish to allow one or more of the viewers to be able to assume control of the presentation to interact with what is being demonstrated. This is common in a software context where a presenter may wish to allow someone seeing a software program for the first time to navigate around the software interface to get a feel for the program and actually run the program during the demonstration. As yet another example, multiple people may wish to collaborate or co-edit a particular document, drawing, or design. In these and many other instances, it may be desirable for the display participant to enable one or more of the viewers to assume control over what is being shown on the remote viewing session.

Since the session may be started by the display participant or, alternatively, by one of the viewer participants, the term "display" is used herein to refer to the computer that is running software that is generating the information that will be displayed on the remote viewing session. The term "display" does not have any connotations as to who started the session. The term "display participant" will refer to a person sitting at the display computer. Likewise, the term "viewer participant" will refer to a person who is viewing the content of the remote viewing session. The term "viewer computer" will be used to refer to the computer associated with the viewer participant that is displaying the content of the remote viewing session to be viewed by the viewer participant.

In one embodiment, by default, if the display participant initiates the remote viewing session, the display participant will control the display computer and, hence, control what is shown during the session. According to an embodiment of the invention, the display participant may allow viewer participants to have remote control over the display computer so that, when a viewer participant assumes remote control, the viewer participant will then be able to control the display computer to control what is shown on the remote viewing session.

Likewise, when the viewer participant initiates the session, and the display participant elects to join the session established by the viewer participant, by default the display participant may provide the viewer participant with remote control over the display computer. In this embodiment, like the previous embodiment where the session was initiated by the display participant, the display participant may regain control over the display computer during the remote viewing session by interacting with one or more of the controls at the display computer.

As discussed in greater detail below, to enable one or more of the viewer participants to assume control over the display computer, the display participant may grant control (referred to herein as remote control) to one or more of the viewer participants. For example, when the display participant wants to grant remote control to one specific viewer participant, to anyone in a group of viewer participants, or to any viewer participant on the session, the display participant may click on a field in the display RVS software interface that will cause a dialog or other menu to appear. The menu may contain entries enabling the display participant to select whether a particular viewer participant should have remote control, whether a group of viewer participants should be provided with remote control abilities, or whether any one of the viewer participants on the session should be provided with remote control ability.

Similarly, if the display participant has provided one or more viewer participants with remote control, the display participant may wish to resume control temporarily or permanently. In one embodiment, the display participant may assume temporary control over the session by moving his mouse, clicking a button on his mouse, or typing on a keyboard/keypad on the display computer. Assuming temporary control in this manner suspends remote viewer participants from assuming control of the presentation on the session but does not permanently disable remote control. Accordingly, after the display participant has stopped interacting with the display computer, the display computer will time out thus causing the remote control to be re-established, so that the viewer participant can once again control the display computer.

If the display participant would like to permanently disable remote control, the display participant may assume temporary control, and then access a dialog or other control provided by the display RVS software interface to more permanently disable remote control. "Permanent" in this context means that remote control will remain disabled until the display participant elects to once again explicitly enable remote control. Unlike "permanent", the term "temporary" conveys the notion that control will automatically revert back to one of the viewers upon expiration of a particular period of inaction by the display participant.

To permanently disable remote control, the display participant may access a dialog/menu or other control. The control may be the same one that was used to initiate remote control. However, to disable remote control the options presented to the display participant may be adjusted such that upon selection of an appropriate entry the display participant may disable remote control for one viewer participant, a group of viewer participants, or all viewer participants on the session.

The remote control feature of the display may be in several states depending on the actions taken by display participant and the actions taken by the viewer participants. For example, the remote control option may be in a "disabled" state when remote control has not been allowed by the display participant. The display remote control option will be in this state if remote control has never been allowed during the session or has been allowed during the session and has since been disabled. In one embodiment, the default state may be set to disable, however if the primary purpose of the session is to allow remote control over the display computer, the default state may instead be set to "ready" or "enable". For example, where the viewer participant initiates the session, the default state of the remote control option of the display computer may be "ready" or "enable" so that the viewer participant may assume control of the display computer as soon as the display computer joins the session.

If the display participant has allowed remote control to a viewer, the remote control option state for that viewer will be "ready". This state indicates that the display computer is ready for remote control to be assumed by one of the viewer participants, but that no viewer participant has, at that time, elected to assume control over the display computer.

Once a display participant has granted remote control, and a viewer participant has assumed remote control, the status of the remote control option of the remote viewing software at the server and viewer will be changed to "enabled". In this state, the viewer participant that has assumed control will control the display computer. In one embodiment, this may be implemented by having the server send a message to the RVS software on the viewer computer to cause the RVS software to send input from the viewer computer over the session. For example, the RVS software on the viewer computer may transmit mouse movements, button depressions, keyboard data entry, and other forms of input from the viewer participant to the display computer. These input signals will be transmitted by the server over the session to the display computer and used by the display computer as if they had been entered locally by the display participant.

Thus, for example, if the viewer participant has assumed control and moves his mouse in a downward motion, the pointer appearing on the display monitor will similarly move in a downward motion. As another example, if the viewer participant moves his mouse to cause the pointer on the display to select a field, and then begins to type on the viewer computer keyboard, the keys depressed by the viewer participant will cause letters to appear in the field of the software on the display computer. Many examples are possible. The server conveys the input from the viewer participant to the display computer to enable the viewer participant to control the display computer and, hence, to control what is shown on the remote viewing session.

As noted above, in one embodiment a state machine is used to govern whether remote control over the display may be assumed by a viewer and the actions the viewer may take at any particular point in time. Table 1 shows an example display state/event table according to an embodiment of the invention:

TABLE I

|  | Disabled | Disabling | Enabling | Enabled | Suspended |
|---|---|---|---|---|---|
| Allow Remote Control (menu) | Enabling Send Enable Msg | Enabling Send Enable Msg |  |  |  |
| Stop Remote Control (menu) |  |  | Disabling Send Disable Msg | Disabling Send Disable Msg | Disabling Send Disable Msg |
| Hide Screen (menu) |  |  | Suspended Send Suspend Msg | Suspended Send Suspend Msg | Suspended Send Suspend Msg |
| Show Screen (menu |  |  |  |  | Suspended Enable return control timeout |
| Mouse Event Keyboard Event (Win) |  |  |  | If past GrantTime Suspended Send Suspend Msg (Re)Set return control timeout |  |
| Return Control Timeout |  |  |  |  | Enabling Send Enable Msg |
| Enable Remote Control Msg Sent |  |  | Enabled |  |  |
| Disable Msg Sent |  | Disabled |  |  |  |
| Suspend Msg Sent |  |  |  |  |  |
| Disable Msg Received | Disabled | Disabled | Disabled | Disabled | Disabled |

In the embodiment summarized by this state table, the remote control display client can be in one of the following states:

Disabled—Remote control is disabled. Remote mouse and keyboard event messages will be ignored. This is the initial Display state.

Disabling—Remote control has been stopped by the Display side. A "Disable Remote Control" message will be sent to the Viewer but has not yet been sent. Remote mouse and keyboard event messages will be ignored.

Enabling—Remote control has been allowed, or a suspension (Display retaking control) has timed out. An "Enable Remote Control" message will be sent to the Viewer, but has not yet been sent.

Enabled—Remote control is enabled. An "Enable Remote Control" message has been sent to the Viewer.

Suspended—Remote control is suspended. The Display has retaken control (e.g. by moving the mouse). Normally after a timeout (Return Control Timeout), remote control will be enabled again. The timeout is reset by further mouse or keyboard events, so the Display retains control as long as s/he is actively using the mouse or keyboard. When the Display is hiding its screen, the timeout is not set.

Similarly, Table II shows an example viewer state/event table according to an embodiment of the invention:

TABLE II

| | Disabled | Ready | Enabled | Suspended | Suspended WasEnabled | Guest Suspended |
|---|---|---|---|---|---|---|
| Enable Remote Control (All or this guest) | Ready If Active show Mouse Ready tip, set Ready cursor | Ready If Active show Mouse Ready tip, set Ready cursor | | Ready If Active show Mouse Ready tip, set Ready cursor | Enabled [Hide mouse tip] If Active set Enabled cursor | Ready If Active show Mouse Ready tip, set Ready cursor |
| Suspend Remote Control (All or this guest) | Suspended [Hide mouse tip] [Set Default cursor] | Suspended Hide mouse tip Set Default cursor | Suspended WasEnabled [Hide mouse tip] Set Suspended cursor | Suspended [Hide mouse tip] Set Default cursor | Suspended [Hide mouse tip] Set Default cursor | Suspended Hide mouse tip Set Default cursor |
| Disable Remote Control (All or this guest) | Disabled [Hide mouse tip] [Set Default cursor] | Disabled Hide mouse tip Set Default cursor | Disabled [Hide mouse tip] Set Suspended cursor | Disabled [Hide mouse tip] Set Default cursor | Disabled [Hide mouse tip] Set Default cursor | Disabled Hide mouse tip Set Default cursor |
| Some other guest has control | | Guest Suspended Show Guest Suspend tip Set Default cursor Set Guest Suspend Timer | Guest Suspended Show Guest Suspend tip Set Suspended cursor Set Guest Suspend Timer | | | Guest Suspended Show Guest Suspend tip Set Default cursor Set Guest Suspend Timer |
| Mouse Down | | If not Window Activate Enabled. Hide mouse tip. If Active, set Enabled cursor. | | Set Suspended cursor | Set Suspended cursor | Set Suspended cursor |
| Mouse Up | | | | Set Default cursor | Set Default cursor | Set Default cursor |
| Activate Viewer Window | | Show Mouse Ready tip Set Ready cursor | Set Enabled cursor | Set Default cursor | Set Default cursor | Show Guest Suspend tip Set Default cursor |
| Deactivate Viewer Window | [Hide mouse tip] Set Default cursor | Hide mouse tip Set Default cursor | [Hide mouse tip] Set Default cursor | [Hide mouse tip] Set Default cursor | [Hide mouse tip] Set Default cursor | Hide mouse tip Set Default cursor |
| Mouse Enter Window | | If Active Show Mouse Ready tip | | | | If Active show Guest Suspend tip |
| Mouse Exit Window | | Hide mouse tip | | | | Hide mouse tip |
| Mouse Moved | | Show Mouse Ready tip (or reset Tip timer) | | | | Show Guest Suspend tip (or reset Tip timer) |
| Guest Suspend Timeout | | | | | | Ready If Active show Mouse Ready tip, set Ready cursor |
| Mouse Tip Timeout | | Hide mouse tip | | | | Hide mouse tip |

In the embodiment summarized by this state table, the remote control viewer client can be in one of the following states:

Disabled—Remote control has not been allowed by the display side. Either never allowed, or was allowed but has been stopped. This is the initial state when the viewer starts and first connects to the remote viewing server.

Ready—The display has allowed control, the viewer is not currently controlling.

Enabled—The viewer has control, this is the only state in which mouse and keyboard events will be sent from the viewer to the server.

Suspended—Remote Control is temporarily suspended by the display. I.e. the display has moved the mouse and temporarily taken back control.

GuestSuspended—Like Suspended, but another viewer has taken control.

SuspendedWasEnabled—Like Suspended, but the viewer previously had control when the display retook control.

Whenever the viewer shows a mouse tip, i.e. a "guest suspend" tip or a "mouse ready" tip, it sets the mouse tip timer. This enables the mouse tip to be shown for a short period of time and then disappear.

Where the remote viewing session is implemented in a window on the viewer computer, the viewer participant may elect to interact with another window rather than with the remote viewing session. In one embodiment, the window containing the remote viewing session should be in focus to enable the viewer participant's interaction to be transmitted on the session. If the viewer participant has another window in focus, the viewer participant's interactions with the viewer computer will be provided to the application running in the window that has focus rather than being transmitted on the remote viewing session.

If the viewer participant has control over the remote viewing session and the window containing the remote viewing session goes out of focus, for example, because the viewer participant elects to cause another window to have focus, control of the remote viewing session may revert back to the display. The state of the remote viewing option in this instance may change from enabled to ready, or to another state depending on the implementation. Alternatively, in another embodiment, control over the presentation may remain with the viewer participant even when the window containing the remote viewing session is not in focus. In this embodiment the viewer participant's input will not be provided over the remote viewing session, but the viewer participant may continue to control the remote viewing session, and may thus again provide input over the remote viewing session once the window containing the remote viewing session regains focus.

The display participant may want to temporarily suspend the viewer participant's ability to control the display computer. For example, the display participant may move his mouse or type something on the keyboard to suspend remote control and obtain temporary control. If the display participant does this, the status of the remote control aspect of the RVS software will transition to "suspended". In this status, remote control has been allowed by the display participant and assumed by the viewer participant, but has been temporarily taken back by the display participant. Transition from "suspended" to "enabled" or to "ready" may occur automatically once the display participant has stopped providing input, or may require display participant to affirmatively re-authorize remote control depending on the embodiment.

The remote control aspect of the RVS software may additionally contain additional states that are relevant only to the viewer participants. For example, the RVS software may enter a "guest suspended" state where a viewer computer previously had control over the display computer and now another viewer computer has taken control. This state is similar to the state where the display participant has re-assumed control, in that the viewer participant does not currently have control but has the possibility of resuming control at a later point.

The state of the remote control feature may be communicated to the session participants in several different ways, depending on the implementation. For example, at the display, a thin border on the display monitor may change color depending on the display state of the remote control option. Similarly, at the viewer, a similar border around a window showing the remote viewing session may change color to notify the viewers when remote control is possible.

Likewise, the mouse pointer or mouse tooltip may change depending on the state of the remote control. Showing the state via the viewer's pointer/cursor is advantageous in that the viewer will likely be focused on their pointer/cursor while interacting with their computer. For example, a default pointer may be implemented as an open arrow or white arrow. When this pointer is presented to a viewer participant, the viewer participant will know that she does not have remote control and that remote control has not been enabled so that she is not able to get remote control over the display computer on the session. When the state of the remote control transitions to ready, enabled, or suspended, different pointers may be presented to the viewer participants to instruct the viewer participants whether control is available and how to obtain control, and whether they currently have control over the display computer. According to an embodiment of the invention, the viewer participants may assume control simply by taking action within the window hosting the remote viewing session, without first assuming control by interacting with a menu-based control system.

Figure 5A:
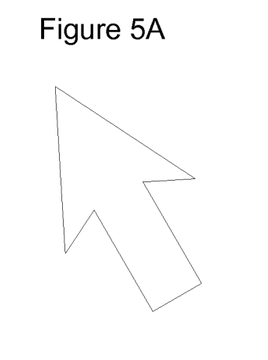
FIGS. 5A-5D show example pointers that may be used to notify viewers of the state of the remote control option according to an embodiment of the invention.

When the display has enabled remote control, the ability of a viewer to take remote control can be communicated by the shape or color of the viewer's pointer. For example, FIGS. 5A-5D show several example viewer pointers that may be used to show the viewer participants the current state of the remote control option. FIG. 5A shows a default pointer which is a normal arrow pointer. When this type of pointer is shown, the viewer participant does not have remote control of the display computer and also is not able to get control of the display computer. This pointer is shown to a viewer participant whenever the remote control option is in the disabled, suspended, viewer suspended, or "suspended was enabled" state, unless the state was previously enabled or the mouse button is pressed and the state is not disabled.

Figure 5B:
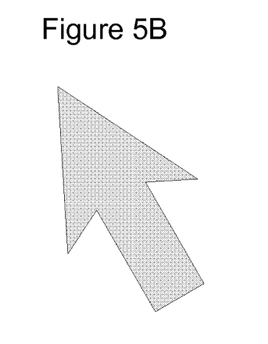

FIG. 5B shows a ready pointer. The ready pointer indicates to the viewer participant that the viewer participant may assume control over the display computer. If the ready pointer is displayed, and the user moves the mouse to move the pointer, a tooltip message will temporarily be displayed containing an instruction, such as "click to control", to instruct the viewer participant how to obtain control of the display. When the ready pointer is shown, the viewer participant may assume control over the display computer by clicking on the window showing the remote viewing session. By using the mouse associated with the viewer computer to click on the window showing the remote viewing session, control over the display computer will be transitioned to the viewer computer so that mouse movements of the viewer computer within the window will cause the display computer pointer to move and be processed by the display computer. Similarly, keystrokes entered on the viewer computer keyboard, when the window showing the remote viewing session has focus, also will be transmitted from the viewer computer to the display computer for processing by the display computer.

In the example shown in FIG. 5B, the ready pointer is a different color than the default pointer (shown in FIG. 5A). For example, the ready pointer may be a bronze-filled arrow. Other colors may be used instead. Likewise, a differently shaped pointer may be used to show a ready state. When the viewer participant sees a bronze pointer, the viewer participant may take control by clicking their mouse in the window containing the remote viewing session "viewer window". The pointer is shown in the "ready" state when the viewer window has focus and the viewer participant's pointer is over the viewer window, but the viewer does not yet have remote control.

Figure 5C:
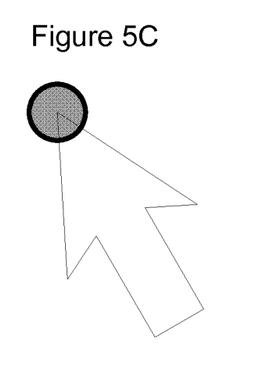

FIG. 5C shows an example of an "enabled" pointer which may be shown to a viewer participant when the remote control option has entered the "enabled" state and that viewer participant has assumed control over the display computer. In the embodiment shown in FIG. 5C, the enabled pointer is drawn as a red dot superimposed on the display pointer's image. When this pointer is shown to the viewer participant, the viewer participant has control, so that mouse movement and clicks are sent to the display computer. Keyboard input by the viewer participant will also be conveyed to the display computer. This pointer is shown in the enabled state when the viewer window has focus.

A red dot may be superimposed on the remote mouse pointer, which may change shape depending on where the mouse pointer is located within the window. For example, it is common for the pointer to switch to an I-shaped pointer when the mouse is above particular applications, so that the user can see where keystrokes will be inserted into the application. The red dot may be superimposed on the I-shaped pointer, on the arrow-shaped pointer shown in FIG. 5C, or on other pointer shapes.

Figure 5D:
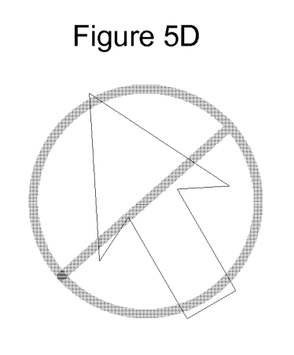

FIG. 5D shows an example of a suspended pointer. In this embodiment, the suspended pointer is shown as a red "not" symbol superimposed over an arrow pointer. The suspended pointer is used when the viewer participant previously had control, but control has been suspended and passed either to the display participant or to another viewer participant. The suspended pointer may be shown at other times as well, for example where the viewer participant attempts to obtain control by clicking on the window showing the remote control session, and remote control has not been authorized by the display participant. In this instance, the pointer shown in FIG. 5D may be temporarily shown to the viewer participant, e.g. while the viewer's mouse button remains down, to instruct the viewer participant that control over the display computer has not been authorized at that time. Optionally, notice may also be provided to the viewer participant that a moment before had control, that one of the other viewer participants has just taken control over the display computer, e.g., a tooltip saying "Another guest has control". Where the remote viewing software supports names, the tooltip may inform the viewer which other viewer has taken control. For example, the tooltip may say "Sue has control" when Sue takes control of the display. Although several examples of pointers have been provided, other examples may be used as well and the invention is not limited to use with these particular pointers.

In addition to changing color/shape, it is also possible to use mouse tooltips to convey state information to the viewer participant and/or display participant and to also convey instructions as to how to transition control between the participants. Mouse tooltips may appear as a short text message in a box next to the mouse pointer. For example, when the display participant selects to allow remote control and the RVS software enters the ready state, a mouse tooltip that recites "click to control" or other phrase of similar import may be displayed to the viewer participants on the RVS session. Where more than one viewer participant has been allowed to have remote control, and one viewer participant has assumed remote control, the other viewer participants that have not assumed remote control may be provided with a mouse tooltip that reads "Another viewer has control" or other words of similar import. Other mouse tooltips may be provided as well. Similarly, toast (small informational windows) may be used to convey information to the participant as to the state of the remote control option. The mouse tooltips may be permanent or may be of shorter temporal duration, such as for one to two seconds. This implicitly teaches the novice users how to use the remote control feature.

The pointer shown to different participants may be colored differently depending on the state of that particular participant. For example, in the ready state, when control has been authorized by the display any viewer participant that has been authorized to assume control will have their pointer change color so that their pointer, when hovering over the active viewer window, in one embodiment, becomes bronze. This signals to the viewer participants that they are able to assume control if they elect to do so. The viewers will still see the display pointer within the display window, in addition to their local bronze pointer. Where only one particular viewer participant has been authorized to assume control, that particular viewer participant will be provided with a bronze pointer while the other viewer participants will be provided with their default pointer. Of course, other pointer colors may be used to convey this state information. Thus, the state information may be conveyed on a per-user basis. By enabling the color and shape of the pointer to be independently reflective of the state of the particular viewer participant, information regarding the session state may be conveyed to each participant, so that transfers of control between the participants may be affected easily and naturally during the remote viewing session During this transition period, before the viewer participant has assumed control, the display participant will still have control over the display computer. Thus, mouse movements made by the display participant will cause the mouse pointer associated with the display to move. As long as the display participant continues to move their mouse, type, or otherwise interact with the display computer, control will remain with the display participant. These movements will appear on the remote viewing session to all of the viewer participants. Once the display participant stops interacting with the display, one of the viewers may assume control of the display computer. Optionally a return control timer may be used to allow the display participant additional time to compete an action (such as choosing "stop remote control" from their menu) before a viewer participant will be allowed to take or regain control.

As noted above, the remote viewing software on the display computer has a remote control option that selectively allows the display participant to control whether a viewer participant can control the display computer. The remote control option, in one embodiment, may be implemented as a state machine (see Tables I and II). Depending on the state of the remote control option, different inputs will cause the state machine to transition to different states so that the display participant and viewer participants may control aspects of the remote control option.

Figure 4A:
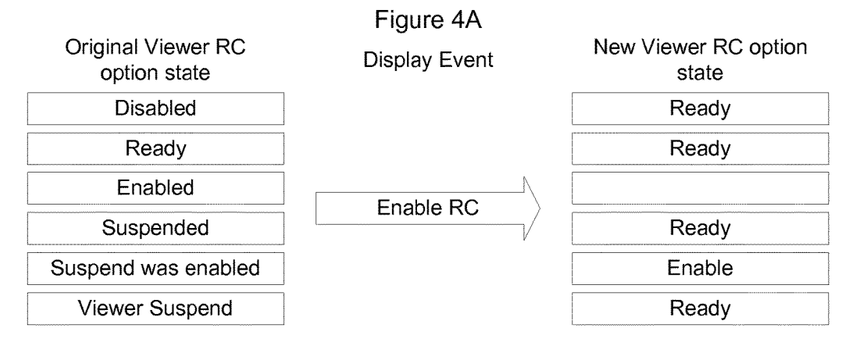
FIGS. 4A-4C shows changes to viewer remote control state upon occurrence of an event by the display according to an embodiment of the invention.
Figure 4B:
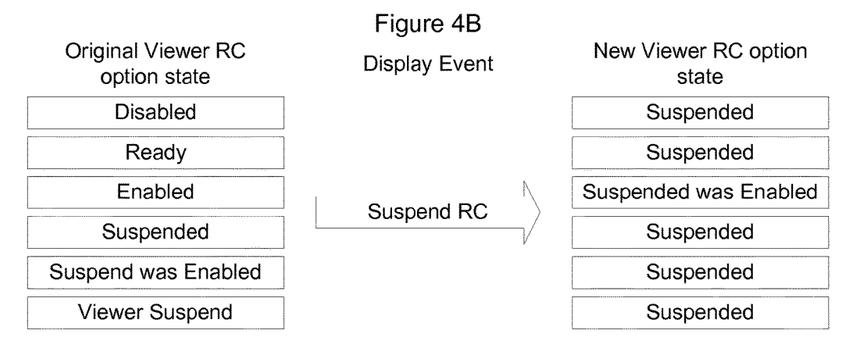
Figure 4C:
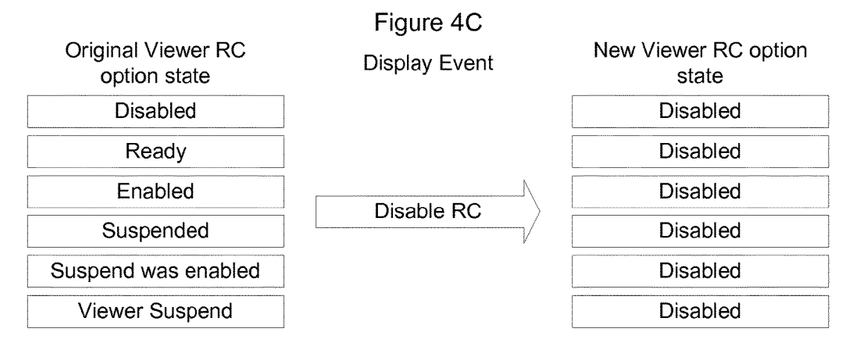

FIGS. 4A-4C show several example viewer state transitions that may occur when the display participant takes action to enable the remote control option (FIG. 4A), suspend remote control (FIG. 4B), or disable remote control (FIG. 4C). There may be other states as well and the invention is not limited to these particular illustrated states and state changes. Likewise, the server may broadcast messages such as "guest has control" when one of the other guests has assumed control of the display computer. Thus, there are other messages and state changes that may occur as well and FIGS. 4A-4C are merely intended to convey several of the more important state changes.

Other state transitions may be controlled by the viewer participant. For example, the viewer participant may provide input to the remote control software to cause the remote control option to transition from the ready state to the enable state (when the viewer participant assumes control over the display computer). Thus, the state transitions shown in FIGS. 4A-4C are not the only state transitions. Additionally, where there are additional states in the remote control option, other inputs may be used to cause the remote control option to transition to/from those other states.

In one embodiment, one or more timers may be used to help smooth transition between states. For example, a grant control timer may be used when the display participant first grants control. Typically, the display participant will grant control over the display using a mouse gesture. Because the display participant may briefly continue to move his mouse, the grant control timer provides a viewer participant with a chance to immediately assume remote control (see table I) even though the display participant has continued to move his mouse. If the display participant is still moving his mouse or typing after this timer expires, a remote viewer is no longer allowed remote control.

Similarly, if the display participant regains control over the display computer because of a local keyboard/mouse event, a return control timer will be used to automatically grant control after the display participant stops interacting with the display computer. After the display suspends remote control, expiration of the return control timer enables remote control to be automatically returned to the viewer after a period of inactivity by the display participant.

A third timer may be used to prevent one viewer from wrenching control away from another viewer who has just assumed remote control. Specifically, a "guest suspend" timeout may be imposed on viewers to prevent other viewers from taking over remote control for a short period of time after another viewer has assumed control. This provides a viewer with a short period of exclusive control over the display computer, vis-à-vis other viewers, so that the other viewers may not interfere with that viewer's control of the display computer.

As shown in FIG. 4A, if the display participant accesses the RVS client and elects to enable remote control, in most cases each viewer's remote control option will change to the "ready" state in which remote control of the display computer may be assumed by one of the viewer participants. For example, if a viewer's original state was the "disabled" state, enabling remote control will cause that viewer's remote control option to transition to the "ready" state. Enabling remote control will not cause a transition to the ready state in two instances: (1) where the remote control option was already in the "enabled" state, and (2) where the remote control option was previously in the "suspend was enabled" state. If the remote control option was in the enabled state, instructing the remote control option to transition to the enabled state will not do anything since the remote control option is already in this state. The "suspend was enabled" state is a state that the remote control option enters where a viewer participant previously had control over the display computer, but control has temporarily been assumed by the display participant. As noted above, the display participant may cause control over the display computer to revert back temporarily by moving the mouse, typing, or providing other input to the display computer. This allows the display participant to regain control over the display computer automatically without requiring the display participant to navigate through a user interface to regain control over the display computer.

As shown in FIG. 4A, if a viewer's remote control option is initially disabled, and the display participant clicks on the appropriate interface option to enable remote control (for one viewer participant, several viewer participants, or for all viewer participants), the state of that viewer's remote control option will change to "ready". This change in state may be shown on the display computer by changing the color of a border around the display screen from yellow to red, and likewise may be shown on the associated viewers' computers by changing the border from yellow to red as well. Thus, the border color may be changed at the display and viewers alike to indicate when remote control has been enabled. Although the color yellow was selected to represent when remote control was not enabled and the color red was selected to represent when remote control was possible, other colors may be used and the invention is not limited to use of these particular colors.

FIG. 4B shows the change of viewer state that will occur if the display participant elects to suspend remote control of the remote control option. The display participant may do this by typing, clicking, or moving the mouse associated with the display computer. When a keyboard/mouse event local to the display occurs, a command will be sent from the display to the server to cause the viewer remote control option state to transition to the "suspended" state regardless of the original state. The one exception is where the viewer's remote control was previously "enabled". In this situation, entry of an instruction to suspend remote control will cause the state to transition to "suspended was enabled" rather than to "suspended". This state enables control to automatically revert back to this same viewer participant when the remote control option is once again enabled (see FIG. 4A) rather than transitioning to the "ready" state.

FIG. 4C shows the viewer change of state that will occur when the remote control option is disabled. As shown in FIG. 4C, regardless of the original state, upon entry of a disable remote control command by the display participant, the state of the viewer remote control option will transition to "disabled". The disabled state exists on the display and the server too, to prevent processing or propagation of any events in transit before the state change on the viewer.

As discussed above, the remote control user interface was designed to enable control to be passed back and forth between the display participant and multiple viewer participants naturally and easily without any buttons or controls to request and grant control, other than initially allowing or finally stopping the remote control by the display participant. This is accomplished via visible state changes using only mouse clicks and movement, state timeouts, and pop-up messages. The mechanism relies on visual cues to the state (typically centered on the mouse pointer which often has the viewer participant's visual attention) as well as on social cues and interactions of the same nature that normally control who speaks during a meeting. By avoiding a menu-driven, explicit, control-allow and control-assume paradigm, control of the display computer may be passed seamlessly between the participants of the remote viewing session.

Figure 6:
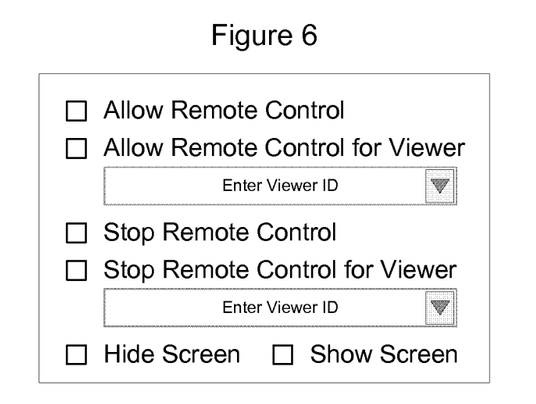
FIG. 6 is a block diagram of an example user interface that may be provided to a display participant to enable the display participant to selectively provide the ability to have remote control over the display computer to one or more of the viewer participants according to an embodiment of the invention.

Depending on the implementation, it may be necessary to provide the display participant with explicit control over some of the remote control aspects. FIG. 6 shows an example user interface that may be provided to the display participant to enable the display participant to control whether any other viewer participant has the ability to exert control over the display computer. As shown in FIG. 6, the display participant may enable the remote control option generally for any viewer participant, to a particular viewer participant, or to a set of viewer participants. The control interface shown in FIG. 6 maybe displayed automatically during a session when the display participant mouses over an icon associated with the remote viewing software.

When a viewer participant assumes control over a remote viewing session, input such as mouse movements, mouse clicks, and keystrokes, input by the viewer participant into the viewer computer will be transmitted from the viewer computer to the display computer if the viewer window has focus. These inputs will then be processed by the display computer as if they had been entered on the associated input device at the display computer, so that the viewer participant may use their local keyboard and mouse connected to the viewer computer to control operation of the remotely located display computer.

One implementation detail that may help improve performance of this type of remote control option is associated with the particular way that TCP messages may be queued. Specifically, particular TCP messages may be queued in a buffer until there are several such messages to be transmitted. This is commonly referred to as "Nagling", which refers to the person who first proposed that this be implemented to increase the proportion of the TCP payload to the proportion of TCP overhead (TCP headers). Nagling is described in greater detail in IETF RFC 896.

If the remote viewing session is implemented using TCP, and Nagling is turned on at one or more of the computers or servers, when the viewer participant assumes control of the remote viewing session the inputs provided by the viewer participant may be queued, and hence delayed, at the viewer computer TCP stack prior to being transmitted to the display computer. Since the TCP stack runs outside of the remote viewing software, the remote viewing software will be unaware that this is occurring. However, since the input to the display computer will be delayed at the viewer computer while the TCP stack queues the viewer input, control over the display computer may appear choppy, or it may appear that there is a time lag between input by the viewer participant and response by the display computer. Thus, for example, the viewer computer may wait until there are sufficient keystrokes before transmitting the input to the display computer. This can detract from performance of the viewer control, by increasing delay associated with transmission of viewer instructions to the display computer. Accordingly, in one embodiment, Nagling may be disabled on all sides of the session (including at the servers) so that the computers will not queue commands at the TCP stack before transmitting them to the display computer. Turning off Nagling can provide a big increase in performance by enabling each keystroke or other command to be directly transmitted from the viewer computer to the display computer.

Another implementation detail that may increase performance is associated with how the remote viewing software accommodates User Account Control (UAC). UAC was introduced by the Windows Vista (™ Microsoft Corporation) operating system as a security measure to prevent malware and other unauthorized software from obtaining administrative privileges on a user's computer. UAC limits application software to standard user privileges even if the user has administrative privileges, until the user explicitly authorizes such privileges for the application software.

In Vista, when an application is installed with limited privileges, the application will not be able to capture UAC dialogs or forward representations of the UAC dialogs to the user. The operating system prevents less privileged applications from capturing or interacting with UAC dialogs. Accordingly, any UAC dialogs from the Windows Vista operating system may not be captured by the remote viewing software and, hence, the user may not be aware of the dialogs. This can lead to confusion in a remote control scenario, as the viewer participant no longer sees exactly what the display participant sees.

Figure 7:
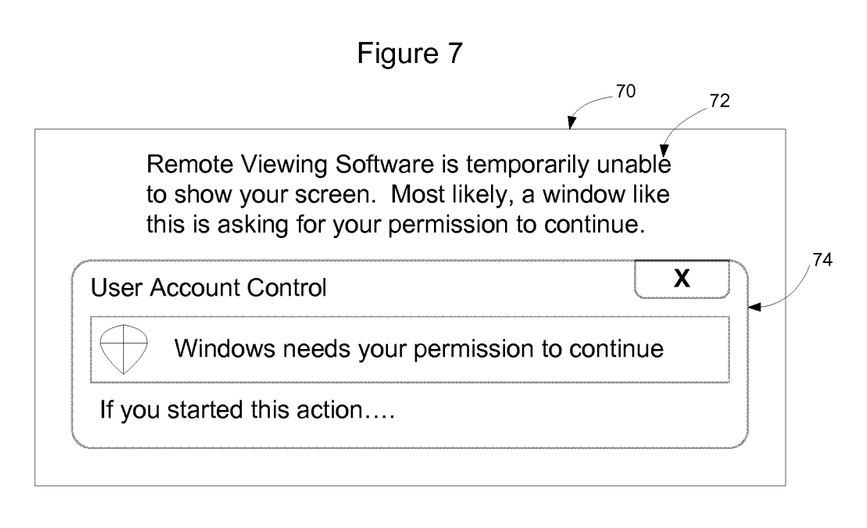
FIG. 7 is a diagram of an example notification that may be provided to a user of the remote viewing software upon occurrence of a User Access Control (UAC) dialog when the remote viewing software is being run on a platform implementing User Access Control.

To get around this, in one embodiment, according to an embodiment of the invention, the display computer may detect when a UAC dialog is shown and send a generic representation of the UAC to the viewer participant. An example notification of this nature is shown in FIG. 7. Although the software cannot capture the UAC dialog itself, it can detect when a UAC dialog occurs and generate its own generic representation of the UAC dialog 70 to be presented to the viewer participants. The generic representation may include an instruction 72 for the viewer participant to instruct the display participant to respond to the UAC dialog and a generic image of an example UAC dialog 74. This enables the remote viewing software to notify the viewer upon occurrence of a UAC dialog so that the display knows to look for the dialog. This also enables the remote viewing software to instruct the viewer participant regarding what the dialog looks like and how to handle the dialog, so that the display participant can interact with the dialog and allow the session to proceed normally.

Although implementation of a way for an application to provide notice of the existence of a UAC dialog was presented in the context of a remote viewing application, the invention is not limited to this particular embodiment as similar UAC dialog notice may be provided in other contexts as well. Thus, whenever UAC dialogs may potentially affect operation of a software application, the application may be configured to watch for issuance of the UAC dialogs and provide a generic representation of the UAC dialog to provide the user with notification of the UAC dialog.

The methods described herein may be implemented as software configured to be executed in the control logic such as contained in a CPU of an electronic device such as a computer. In particular, the RVS software or portions of the RVS software may be implemented as a set of program instructions that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It also should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of interworking an application running with limited user privileges with an operating system implementing User Account Control (UAC), the method comprising the steps of:
    listening, by the application with limited user privileges, for the operating system to issue a UAC dialog; and
    upon detection of the existence of the issued UAC dialog, providing, by the application, a generic representation of an example UAC dialog without reference to the issued UAC dialog, to enable a user of the application to be notified of the existence of the issued UAC dialog via the application interface;
    wherein the application with limited user privileges is remote viewing software transmitting a view of a computer screen to a display participant, and wherein the step of providing the generic representation of an example UAC dialog without reference to the issued UAC dialog causes the generic representation of the example UAC to be injected into the transmitted view of the computer screen and shown to the display participant.

2. The method of claim 1, wherein interaction with the generic representation of the UAC dialog within the application interface does not affect the issued UAC dialog.

3. The method of claim 1, wherein the generic representation of the example UAC dialog also includes an instruction as to how the user should interact with the issued UAC dialog.

4. The method of claim 1, wherein the operating system on which the remote viewing software is running prevents the remote viewing software from capturing or interacting with the issued UAC dialog.

5. A non-transitory tangible computer readable storage medium having stored thereon a computer program for implementing a method of interworking an application running with limited user privileges with an operating system implementing User Account Control (UAC), the computer program comprising a set of instructions which, when executed by a computer, causes the computer to perform a method comprising the steps of:
    listening, by the application with limited user privileges, for the operating system to issue a UAC dialog; and
    upon detection of the existence of the issued UAC dialog, providing, by the application, a generic representation of an example UAC dialog without reference to the issued UAC dialog, to enable a user of the application to be notified of the existence of the issued UAC dialog via the application interface;
    wherein the application with limited user privileges is remote viewing software transmitting a view of a computer screen to a display participant, and wherein the step of providing the generic representation of an example UAC dialog without reference to the issued UAC dialog causes the generic representation of the example UAC to be injected into the transmitted view of the computer screen and shown to the display participant.

6. The non-transitory tangible computer readable storage medium of claim 5, wherein interaction with the generic representation of the UAC dialog within the application interface does not affect the issued UAC dialog.

7. The non-transitory tangible computer readable storage medium of claim 5, wherein the generic representation of the example UAC dialog also includes an instruction as to how the user should interact with the issued UAC dialog.

8. The non-transitory tangible computer readable storage medium of claim 5, wherein the operating system on which the remote viewing software is running prevents the remote viewing software from capturing or interacting with the issued UAC dialog.

* * * * *